United States Patent
Kulkarni et al.

(10) Patent No.: US 6,956,718 B1
(45) Date of Patent: Oct. 18, 2005

(54) SANDWICH DIAMOND-LIKE CARBON OVERCOAT FOR USE IN SLIDER DESIGNS OF PROXIMITY RECORDING HEADS

(75) Inventors: Ashok Venkatesh Kulkarni, Sunnyvale, CA (US); Vijay Prabhakaran, Fremont, CA (US); Pablo Gabriel Levi, Milpitas, CA (US); Biao Sun, Fremont, CA (US); Eric Thomas Sladek, Pleasanton, CA (US); Michael Thomas Sullivan, Fremont, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 255 days.

(21) Appl. No.: 10/223,992

(22) Filed: Aug. 19, 2002

(51) Int. Cl.$^7$ ................................................. G11B 5/60
(52) U.S. Cl. ................................................. 360/235.1
(58) Field of Search ........................... 360/235.1–235.2, 360/235.4–235.5, 235.8, 236.3, 236.6, 237, 360/122

(56) References Cited

U.S. PATENT DOCUMENTS

| | | | |
|---|---|---|---|
| 5,175,658 A * | 12/1992 | Chang et al. ............ | 360/235.2 |
| 5,271,802 A | 12/1993 | Chang et al. ............ | 156/643 |
| 5,674,638 A * | 10/1997 | Grill et al. ............ | 428/694 TC |
| 5,943,187 A | 8/1999 | Chen et al. ............ | 360/103 |
| 6,246,538 B1 * | 6/2001 | Kasamatsu et al. ...... | 360/97.01 |
| 6,351,345 B1 * | 2/2002 | Kameyama ............ | 360/236.3 |
| 6,396,664 B2 * | 5/2002 | Koishi et al. ............ | 360/235.8 |
| 6,424,494 B1 * | 7/2002 | Koishi ............ | 360/235.6 |
| 6,424,495 B1 * | 7/2002 | Kobayashi et al. ...... | 360/236.5 |
| 6,433,965 B1 * | 8/2002 | Gopinathan et al. ...... | 360/235.4 |
| 6,624,977 B1 * | 9/2003 | Boutaghou ............ | 360/235.2 |
| 6,728,069 B2 * | 4/2004 | Otsuka et al. ............ | 360/235.8 |

* cited by examiner

*Primary Examiner*—Angel Castro
(74) *Attorney, Agent, or Firm*—Joshua C. Harrison, Esq.; Samuel A. Kassatly, Esq.

(57) ABSTRACT

A slider is formed of an air bearing surface coated with a wear limiting coating that substantially limits surface wear of the air bearing surface encountered in proximity recording. The wear limiting coating is comprised of a wear inhibiting layer formed on the air bearing surface and a sacrificial layer formed on the wear inhibiting layer. The two coatings of the wear limiting coating have different mechanical properties so that the sacrificial layer is burnished, exposing the wear inhibiting layer. This design substantially limits the surface wear of the air bearing surface typically encountered in proximity recording, resulting in less debris accumulation, which could otherwise adversely affect the performance of the proximity recording head. This self-limiting burnishing action overcomes the flying height variation due to manufacturing tolerances and provides extremely small and uniform magnetic spacing, which greatly enhances the proximity recording. Moreover, the burnishing action also achieves an improved flying stability and a reduction in the altitude sensitivity.

16 Claims, 8 Drawing Sheets

SANDWICH DIAMOND-LIKE CARBON OVERCOAT FOR USE IN SLIDER DESIGNS OF PROXIMITY RECORDING HEADS

CROSS-REFERENCE TO RELATED APPLICATION

The present application is related to co-pending U.S. patent application Ser. No. 10/223,922, titled "Proximity Recording Air Bearing Design for a Data Storage System," which is assigned to the same assignee as the present application, and which is incorporated herein by reference in its entirety.

FIELD OF INVENTION

The present invention relates in general to data storage systems such as disk drives, and it particularly relates to a thin film read/write head for use in such data storage systems. More specifically, the present invention provides a new sandwich layer of diamond-like carbon (DLC) overcoat for use in slider designs of proximity recording heads. The DLC layer design substantially limits the surface wear of the air bearing surface typically encountered in proximity recording, resulting in less debris accumulation which would otherwise adversely affect the performance of the proximity recording head.

BACKGROUND OF THE INVENTION

In a conventional magnetic storage system, a thin film magnetic head includes a read/write element mounted on a slider. The magnetic head is coupled to a rotary actuator magnet and a voice coil assembly by a suspension and an actuator arm positioned over a surface of a spinning magnetic disk.

In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk. The flying height is defined as the spacing between the surface of the spinning magnetic disk and the lowest point of the slider assembly.

One objective of the design of magnetic read/write heads is to obtain a very small flying height between the read/write element and the disk surface. By maintaining a flying height close to the disk, it is possible to record short wavelength or high frequency signals, thereby achieving high density and high storage data recording capacity.

The slider design incorporates an air bearing surface to control the aerodynamic interaction between the magnetic head and the spinning magnetic disk thereunder. Air bearing surface (ABS) sliders used in disk drives typically have a leading edge and a trailing edge. A thin film read/write element is formed at the trailing edge of the slider.

Generally, the sliders have tapered portions at the leading edge and longitudinal side rails that extend from the tapers to the trailing edge. The tapers may be shaped and of such length as to provide fast pressure buildup during takeoff of the slider from a rest position to a flying height relative to the disk with controlled pitch. The dimensions and shapes of the tapers and side rails are instrumental in determining the flying characteristics of the head. The side rail design determines the pressure generated at the ABS of the slider. In effect, the pressure distribution on the ABS contributes to the flying characteristics of the slider that include flying height, pitch, and roll of the read/write head relative to the rotating magnetic disk.

In a conventional magnetic media application, a magnetic recording disk includes a landing zone, which is defined as an annulus area of a width of about 0.2 inch located at the inner radius of the magnetic disk. The landing zone is a textured area and its sole function is to provide a surface upon which the slider comes to rest in between track seeks during a read/write operation. The surface of the landing zone typically is optimized to have a certain degree of roughness so as to prevent stiction between the slider and the disk and yet enable a fast take-off of the slider.

As the trend toward high capacity storage applications continues, smooth media applications have emerged to supplant conventional media applications with increasing acceptance due to a principal advantage of smooth media disks in offering a higher data storage capacity than conventional media disks. This advantage is afforded by the absence of the landing zone, which is reclaimed for increasing the data storage area of a magnetic disk. Hence, a smooth media disk is characterized by a finely polished surface in its entirety from the outer radius to the inner radius of the disk without a landing zone.

Accompanied with the emergence of smooth media disks, the current trend in the magnetic storage technology has also been to push the slider design toward a near zero flying height in order to reduce the magnetic spacing, thereby increasing the data recording capacity. This type of slider design is typically referred to as proximity or contact recording, which employs a contact pad concept, wherein a small pad is etched around the pole tip region. Furthermore, to attain high linear or areal density, such a slider design may include a giant magnetoresistive (GMR) read/write sensor.

In proximity recording, the air bearing surface (ABS) is typically designed to have high a pitch stiffness that causes the contact pad in the trailing edge region of the ABS, to which the read/write sensor is physically attached, to remain in actual contact with the highest asperities on the smooth media disk surface during the initial phase of operation. Because of this contact action, surface wear of the slider as well as the media disk takes place during this process, which is also referred to as burnishing.

Since the contact point is localized at the contact pad region, the pads burnishes continuously. The burnishing process gradually decelerates and eventually stops when the contact pad no longer encounters any asperities on the smooth media disk surface, thereby achieving a steady state clearance. Thereupon, the goal of the proximity recording is realized as the slider attains a near zero flying height and thereby reduce the magnetic spacing. Hence, the success of the proximity recording head depends on understanding and controlling the wear evolution of slider-disk interface.

Because of the surface contact with the magnetic storage disk made by the trailing edge region of the ABS, the surfaces of the magnetic storage disk and the ABS of the conventional slider experience a continual erosion or wear, thereby resulting in material loss from both the magnetic storage disk and the ABS. This material loss forms debris in the vicinity of the pole tip region of the read/write sensor. As the debris accumulates, the ability of the proximity recording head to register binary data onto the magnetic storage disk suffers a significant degradation due to an increase in spacing between the pole tip and the surface of the magnetic storage disk. The head is no longer flying, but is supported by the contamination. In general, the severity of the wear is controlled within the specified design tolerances by optimizing the tribology of the ABS material. The maximum wear is proportional to the initial interference height of the slider-disk interface. If the wear were not properly controlled, the burnishing would eventually expose the GMR read/write sensor to the ambient. Because of its susceptibility to atmospheric corrosion, the GMR read/write sensor may fail to achieve its functionality and proximity recording performance when exposed to the drive environment.

To address this concern in the slider design of a proximity recording head, presently an exemplified tribological design incorporates a conventional diamond-like carbon (DLC) protective pad onto the trailing edge region of the ABS wherein the read/write sensor is mounted. The conventional DLC protective pad is generally formed by a two-layer material comprising of an outer DLC layer disposed above an underlying silicon (Si) seed layer. The outer DLC layer is usually derived from ethylene as a precursor, hence also referred to as E-DLC.

While the conventional two-layer DLC pad may have in theory provided a satisfactory resolution of the foregoing concern, in practice it does have a serious deficiency that likely renders the goal of proximity recording unattainable. This deficiency lies in the fact that due to manufacturing tolerances, there exists a small deviation in the design flying height of the slider, which herein is referred to as sigma. The flying height sigma translates into a distribution of interference height, resulting in some sliders exposing to larger interference heights than others. Consequently, this presents a number of challenging problems to the conventional DLC pad.

Because the E-DLC layer of the conventional DLC pad would experience a varying degree of burnishing due to the flying height sigma, the proximity recording heads employing the conventional DLC pads thus cannot in general achieve uniform steady state clearance or magnetic spacing, thereby leading to a varying performance of such proximity recording heads.

Moreover, the inability to cope with the distribution of flying height sigma also increases the risk of a potential excessive wear of the E-DLC layer of the conventional contact DLC pad when the slider is flying closer to the magnetic disk surface than the average flying height. In some instances, the wear of the conventional contact DLC pad is so extensive that allows the read/write sensor to be exposed to the corrosive environment in which the proximity recording head operates. Once exposed, the read/write sensor becomes oxidized or corroded quite rapidly, thereby resulting in damage to the proximity recording head and consequently causing catastrophic failure of the magnetic disk drive.

In light of unresolved concerns with the conventional DLC protective pad employed in proximity recording applications, it is realized that there is an unfulfilled need for an improved DLC pad design for proximity recording that addresses the problems associated with the flying height sigma variation of the sliders in the proximity recording heads. Preferably, the improved DLC pad design should be insensitive to the flying height sigma in a manner that would allow the burnishing to achieve uniform steady state clearance and magnetic spacing in spite of the variation in the flying height. More importantly, the improved DLC pad design should be able to provide a complete protection of the read/write sensor during burnishing by limiting the wear process. These preferences, therefore, establish a goal for proximity recording that would enable the current advancement in high capacity magnetic storage applications to continue to progress.

SUMMARY OF THE INVENTION

The present invention can be regarded as a recording head comprising a read/write transducer and a slider having an air bearing surface. The air bearing surface includes a center pad and the center pad includes an aft strip that includes the read/write transducer. The aft strip also includes a protective layer. The protective layer includes a seed layer, a wear-limiting layer, and a sacrificial layer. The sacrificial layer includes diamond like carbon (DLC).

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
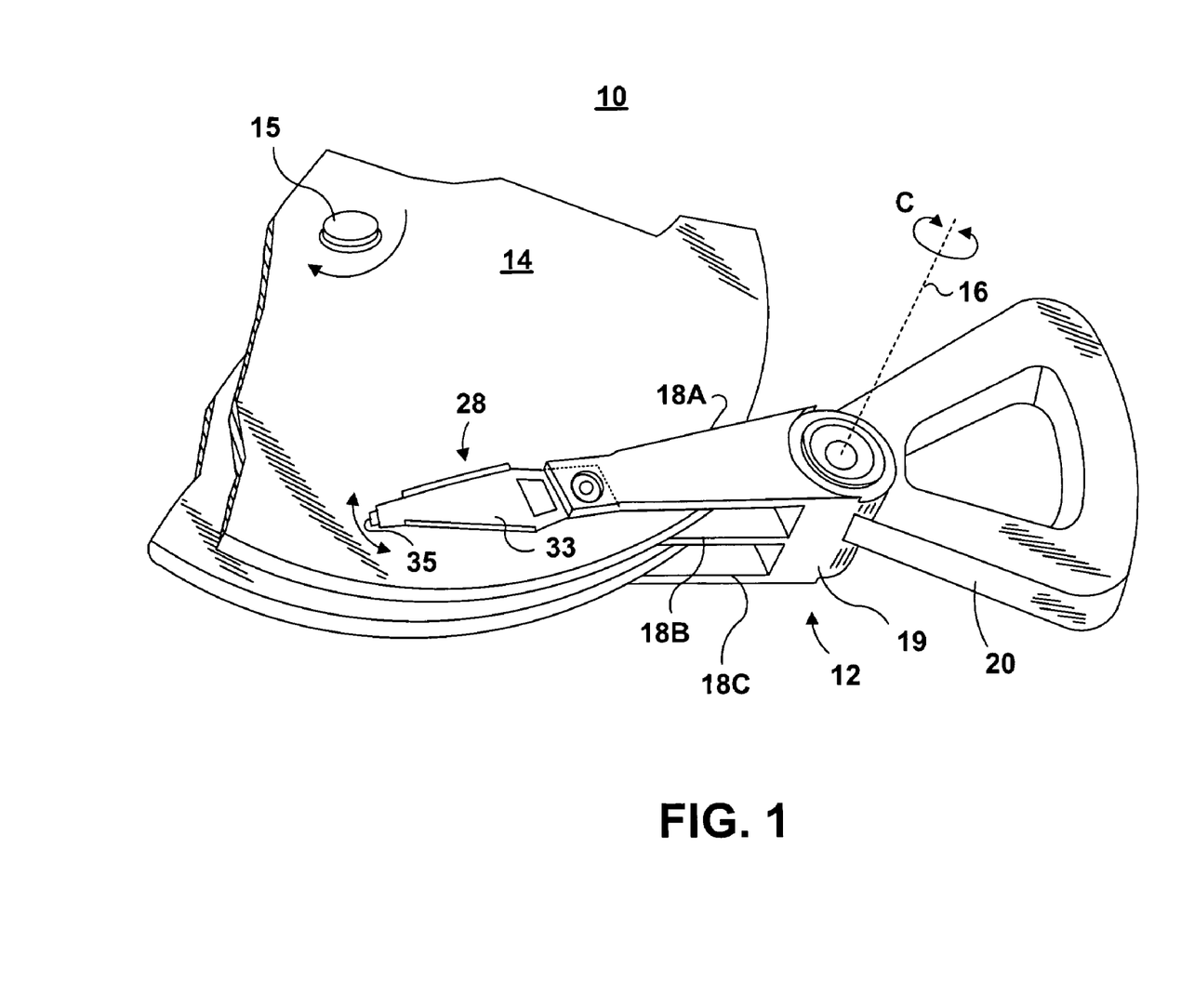
FIG. 1 is a fragmentary perspective view of a data storage system utilizing a read/write head of a conventional design or of the present invention.

FIG. 1 illustrates a disk drive 10 comprised of a head stack assembly 12 and a stack of spaced apart smooth media magnetic data storage disks or smooth media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
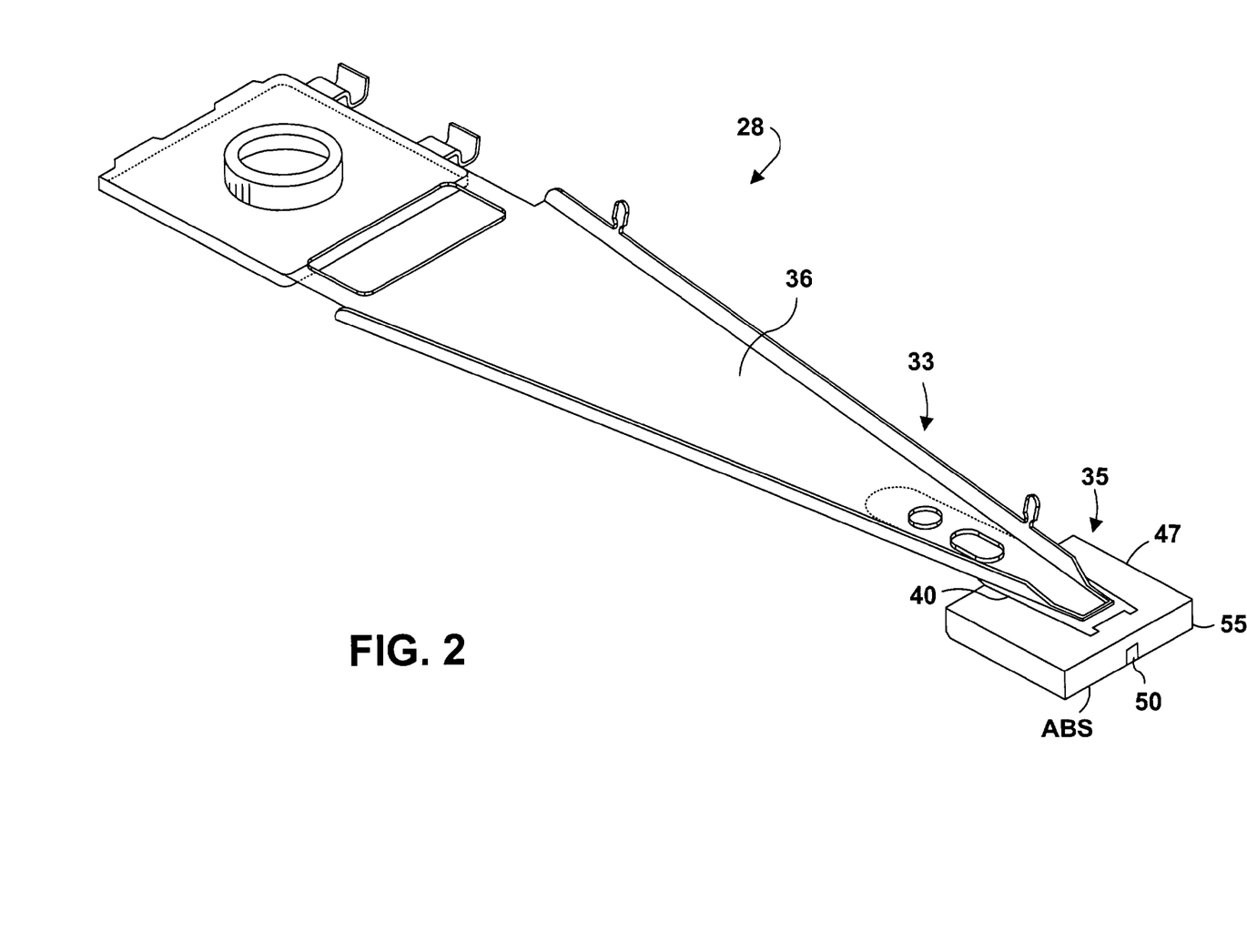
FIG. 2 is a perspective view of a head gimbal assembly comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured. The head 35 is formed of either a slider 47 made according to the present invention secured to the free end of the load beam 36 by means of the flexure 40, and a read/write element 50 supported by the slider 47. The read/write element 50 is mounted at the trailing edge 55 of the slider 47 so that its forwardmost tip is generally flush with the ABS 58 of the slider.

Figure 3:
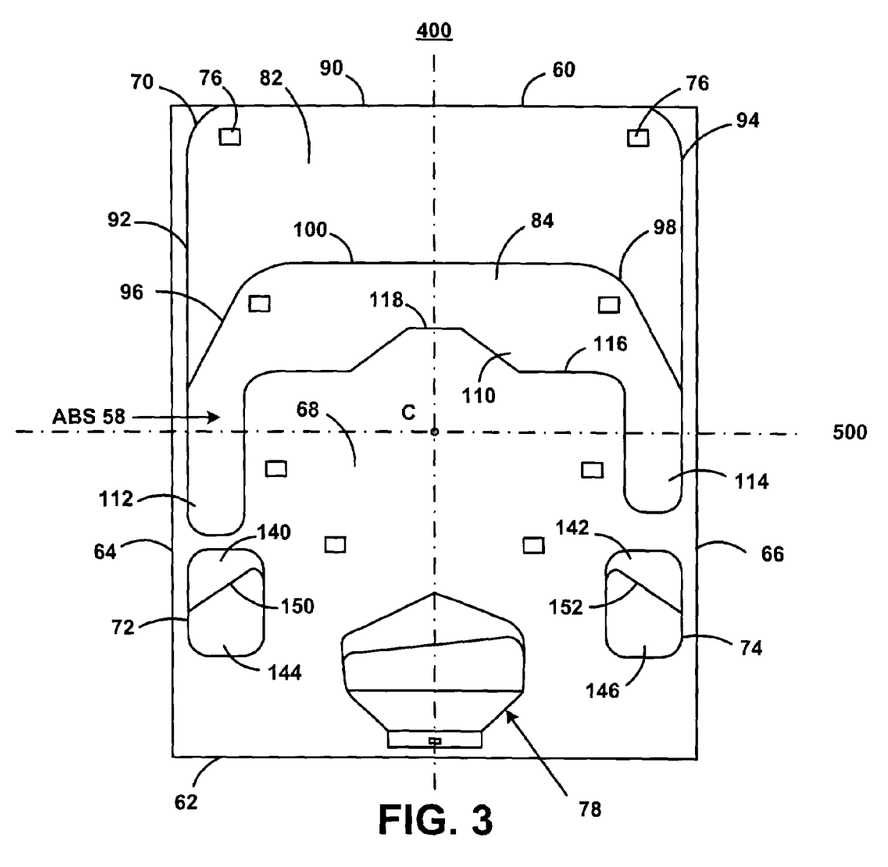
FIG. 3 is a top view of the ABS of the slider of FIG. 2 comprised of various patterned features which includes a trailing edge center pad.

With reference to FIG. 3, the ABS 58 of the slider 47 is generally formed of a rectangular shape bounded by an ABS leading edge 60, an ABS trailing edge 62, and two ABS sides 64 and 66.

For convenience, two orthogonal axes are introduced in FIG. 3 to aid the description of the slider 47. A longitudinal axis 400 is parallel to the ABS sides 64 and 66 and bisects the ABS 58 to form a line of symmetry. A transverse axis 500 intersects with and is perpendicular to the longitudinal axis 400 at the center of the ABS 58.

A patterned topology of varying width and depth is formed upon the surface of the ABS 58. This patterned topology is designed to shape the aerodynamic pressure characteristic on the ABS 58 during proximity recording in order to achieve a desired lift force acting on the slider 47. The patterned topology is further comprised of a number of specialized regions and features. In general, these specialized regions and features include a cavity region 68, a patterned leading edge pad 70, two oppositely disposed patterned side pads 72 and 74, a plurality of supporting posts 76, and a patterned trailing edge center pad 78. In particular, the trailing edge center pad 78 incorporates a new sandwich DLC protective pad made according to the present invention to achieve uniform magnetic spacing and to protect the read/write element 50 by inhibiting surface wear of the ABS 58.

With reference to FIG. 3, the cavity region 68 is comprised substantially of the surface of the ABS 58, generally extending from the patterned leading edge pad 70 toward to ABS trailing edge 62. The cavity region is formed by either reactive ion etching (RIE) or ion milling to a depth of 50 to 120 $\mu$in relative to the datum surface 80 of the ABS 58.

With further reference to FIG. 3, the patterned leading edge pad 70 is further comprised of a shallow step region 82 and an ABS region 84. The shallow step region 82 is generally formed of a polygonal shape having a plurality of sides to be described hereafter. A leading edge side 90 is formed on and extends nearly the length of the ABS leading edge 60. Two sides 92 and 94 are disposed parallel to and slightly offset inwardly from the two ABS sides 64 and 66. The sides 92 and 94 join with the leading edge side 90 at its two ends via small curved segments. Two angular sides 96 and 98 then join with the sides 92 and 94 at their other respective ends. A side 100 is disposed parallel to the leading edge side 90 and connects to the angular sides 96 and 98 via small curved segments to complete the polygon that defines the leading shallow step region 82 of the patterned leading edge pad 70.

In a typical manufacturing sequence, the leading edge shallow step region 82 is formed by either reactive ion etching (RIE) or ion milling to a depth of approximately 4 to 10 microinches relative to the datum surface 80 of the ABS 58.

With reference to FIG. 3, the ABS region 84 of the patterned leading edge pad 70 generally resembles a shape of the letter "C" having three identifiable areas: a center portion 110, and two side rail portions 112 and 114. As a reference, the surface of the ABS region 84 defines the datum surface 80 of the ABS 58.

The center portion 110 of the ABS region 84 adjoins the leading edge shallow step region 82 along the two angular sides 96 and 98 and the side 100 that collectively define one side of the center portion 110. A segmented side 116 defines the other side of the center portion 110. Further, the segmented side 116 is generally shaped so as to form a trapezoidal notch area 118 in the center portion 110 of the ABS region 84.

The two side rail portions 112 and 114 are oppositely disposed and connect to either end of the center portion 110. The side rail portions 112 and 114 are generally formed of rectangular tabs that extend toward the ABS trailing edge 62 and are slightly offset inwardly from the ABS sides 64 and 66 of the ABS 58.

The two oppositely disposed patterned side pads 72 and 74 are situated toward the trailing edge region of the ABS 58. The patterned side pads 72 and 74 are generally of a rectangular shape with radius corners. Furthermore, the patterned side pads 72 and 74 are slightly offset inwardly from and extend parallel to the ABS sides 64 and 66 of the ABS 58.

The patterned side pads 72 and 74 are further comprised of shallow step regions 140 and 142, and ABS regions 144 and 146, respectively. The shallow step regions 140 and 142 are generally of a trapezoidal shape with radius corners and are formed by etching. In an exemplary preferred embodiment, the shallow step regions 140 and 142 are etched to the same depth as that of the leading shallow step region 82, though it should be understood that the shallow step regions 140 and 142 could be etched to a different depth.

The ABS regions 144 and 146 adjoin the shallow step regions 140 and 142, respectively along two angular interfaces 150 and 152. The ABS regions 144 and 146 generally feature a trapezoidal geometry with radius corners and are built up to the same height as the reference datum surface 80 of the ABS 58.

A plurality of supporting posts 76 are positioned at various locations throughout the ABS 58. With reference to FIG. 3 of the preferred embodiment, the ABS 58 includes eight supporting posts 76: two located in the leading edge shallow step region 82, two in the leading edge ABS region 84, and the remaining located in the cavity region 68.

Figure 5:
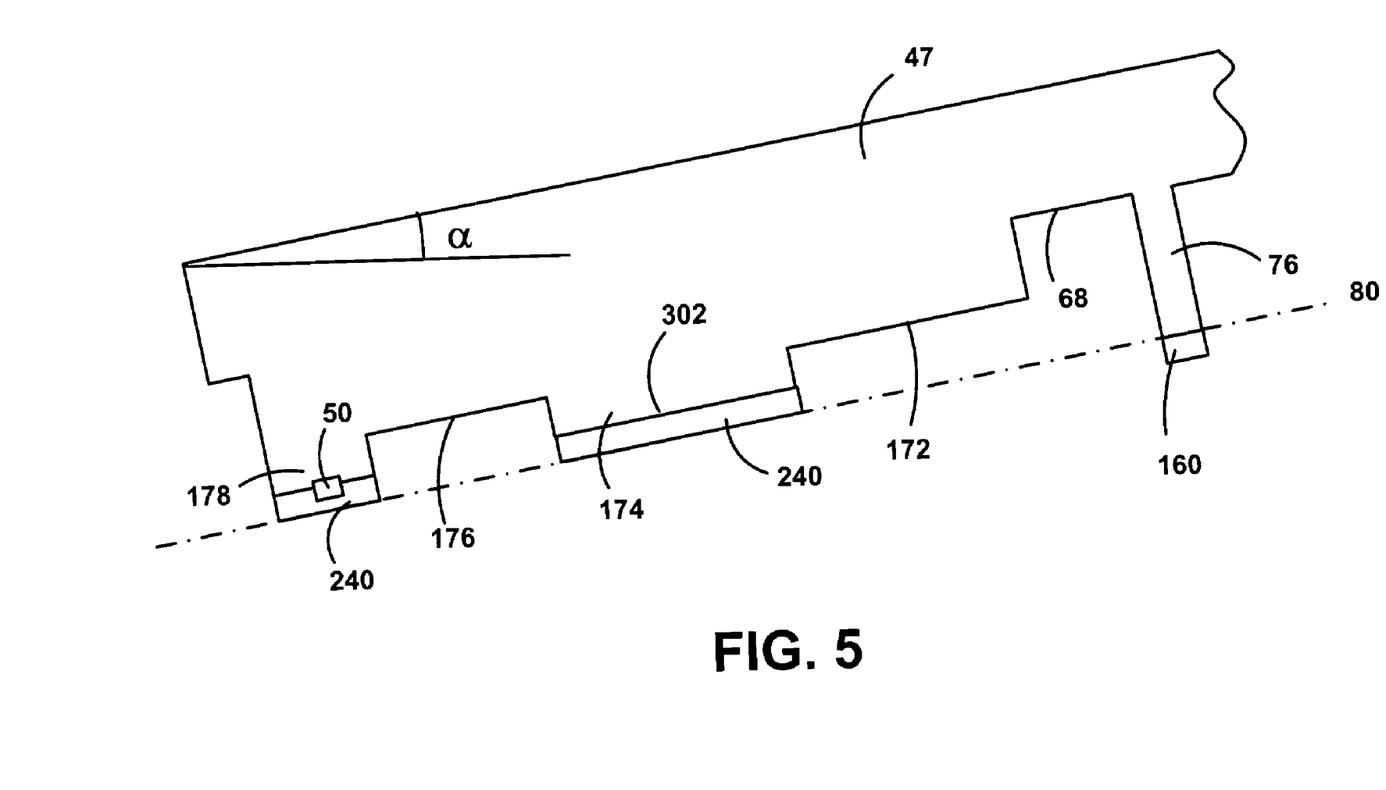
FIG. 5 is a cross sectional view of the trailing edge center pad of FIG. 4.

With reference to FIG. 5 taken along the axis 400, the supporting posts 76 are generally of a cylindrical shape that protrudes outwardly from the bottom surfaces of the leading shallow step region 82, the leading edge ABS region 84, and the cavity region 68. According to a preferred embodiment, new sandwich diamond like carbon (DLC) protective pads 160 of the present invention are secured to, or formed on the tips of the supporting posts 76. The posts 76 raise the DLC pads 160 of the present invention to a height above the reference datum surface 80 of the ABS 58.

When the slider 47 is at a rest position on the smooth media disk 14, the DLC pads 160 of the present invention come into contact with the smooth media disk 14 and provide a support to the ABS 58, thereby preventing the ABS 58 from making contact with the surface of the disk 14 which would pose a potential damage to the read/write element 50. Furthermore, the DLC pads 160 enable the slider 47 to take off rapidly for performing a track seek.

Figure 4:
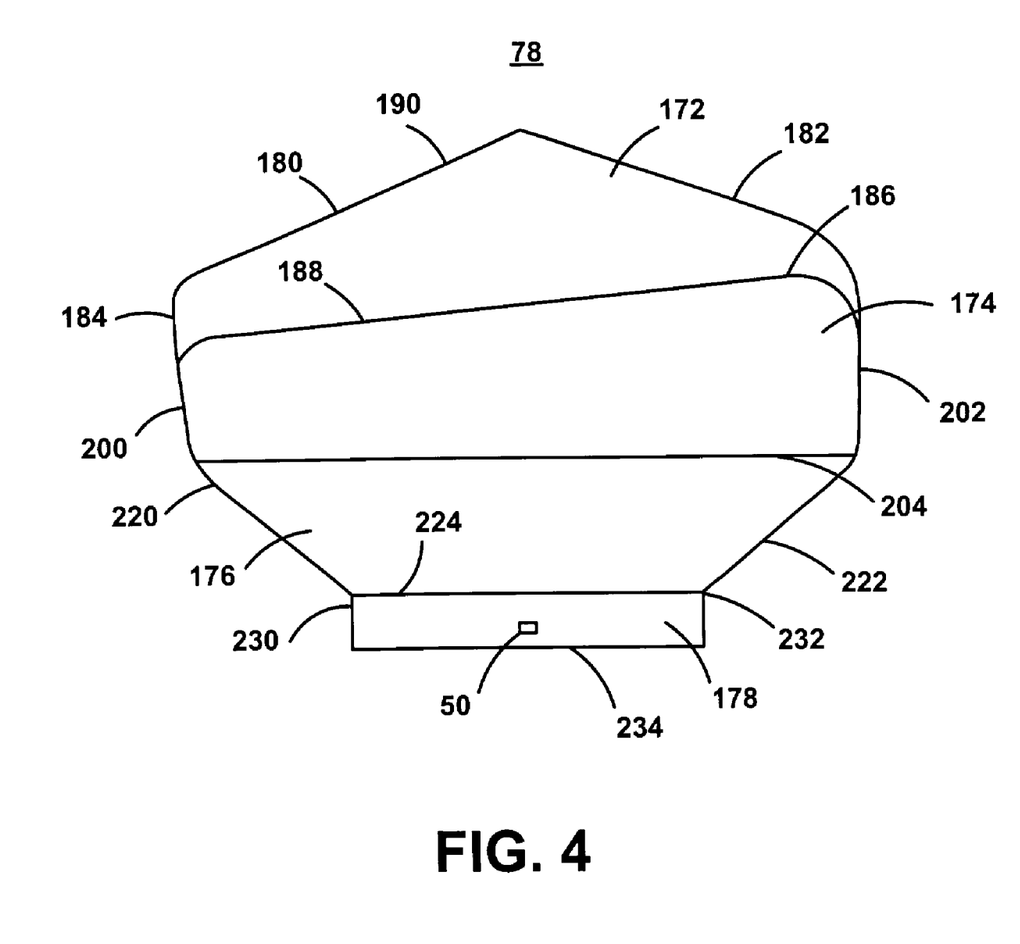
FIG. 4 is an enlarged top view of the trailing edge center pad of the ABS of FIG. 3 including a contact ABS pad, made according to the present invention.

With reference to FIGS. 3 and 4, the trailing edge center pad 78 is generally formed of a polygonal shape and is disposed adjacent to the ABS trailing edge 62 of the ABS 58.

The trailing edge center pad 78 is further comprised of four specialized regions: a forward shallow step region 172, a forward ABS region 174, an aft shallow step region 176, and a contact ABS pad 178. In particular, the novelty of the present invention lies in the material and spatial design of the contact ABS pad 178, which will be apparent in the subsequent description.

With reference to FIG. 4, the forward shallow step region 172 is generally a pentagon bounded by sides 180, 182, 184, 186, and 188. The sides 180 and 182 are joined by a radius corner and form an inverted V-shaped forward edge 190. The side 188 is oppositely disposed from the inverted V-shaped forward edge 190 and defines an interface between the forward shallow step region 172 and the forward ABS region 174. The two sides 184 and 186 are oppositely disposed about and nearly parallel to the longitudinal axis 400 of the ABS 58. The two sides 184 and 186 join with the inverted V-shaped forward edge 190 and the interface side 188 to complete the definition of the forward shallow step region 172. The depth of the forward step region relative to the reference datum surface 80 of the ABS 58 generally depends on various factors such as suspension gram load, rotation speed of the smooth media disk 14, skew angle, etc.

The forward ABS region 174 adjoins the forward shallow step region 172 along the interface side 188 and generally is shaped as a trapezoid, which is bounded by the interface side 188, and sides 200, 202, and 204. The sides 200 and 202 are extension of the sides 184 and 186 of the forward shallow step region 172. The side 204 defines an interface between the forward ABS region 174 and the aft shallow step region 176.

With reference to FIG. 5 of the preferred embodiment, a new sandwich DLC pad 240 made according to the present invention is deposited onto the forward ABS region 174 to form a surface at the same level as the reference datum surface 80 of the ABS 58.

With reference to FIG. 4, the aft shallow step region 176 of the trailing edge center pad 78 adjoins the forward ABS region 174 along the interface side 204 and is generally shaped as a trapezoid, which is bounded by the interface side 204, two oppositely disposed angular sides 220 and 222, and a side 224 parallel to the ABS trailing edge 62 of the ABS 58. The side 224 also defines the interface between the aft shallow step region 176 and the contact ABS pad 178. The depth of the aft shallow step region 176 typically ranges from 3 to 10 $\mu$in relative to the reference datum surface 80 of the ASS 58, and the length of the aft shallow step region 176 along the axis 400 is generally about 2 to 4 mils.

The contact ABS pad 178 is located at the aftmost position on the ABS 58 and adjoins the aft shallow step region 176 along the interface side 224. The contact ABS pad 178 is generally formed of a high-aspect-ratio rectangular shape, with the width along the transverse axis 500 much greater than the length along the longitudinal axis 400. The length of the contact ABS pad 178 typically ranges from 0.5 to 1.0 mils. The rectangular shape of the thin contact ABS pad 178 is defined by the interface side 224, two oppositely disposed sides 230 and 232, and a side 234 that is parallel to the interface side 224. The side 234 is slightly offset and parallel to the ABS trailing edge 62 of the ABS 58.

The thin contact ABS pad 178 also contains the read/write element 50, which is located along the longitudinal axis 400 and adjacent to the side 232. In a preferred embodiment, a new sandwich DLC pad 240 made according to the present invention is deposited onto the ABS region 174 to embed the read/write element 50. The top of the DLC pad 240 is formed at the same level as the reference datum surface 80 of the ABS 58.

Figure 6:
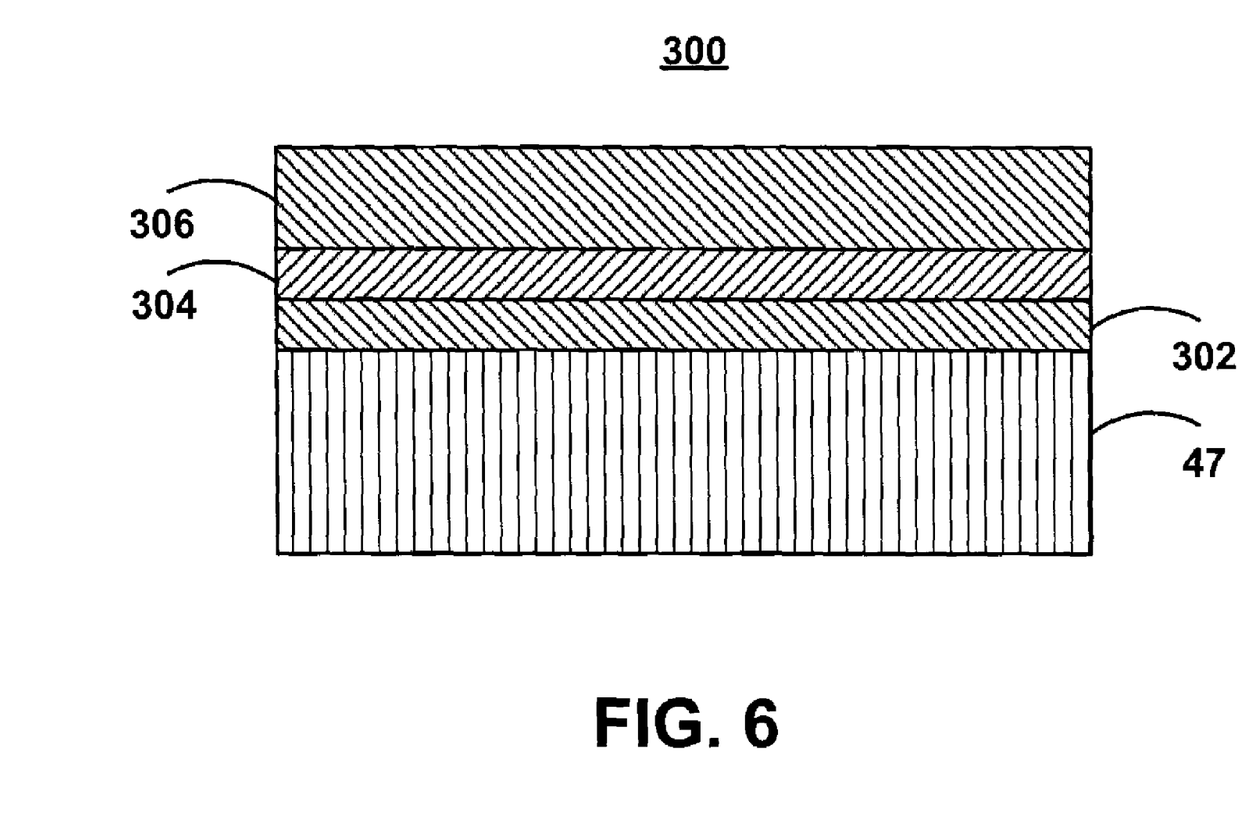
FIG. 6 is a schematic of a sandwich DLC process made according to the present invention.

With reference to FIG. 6, the new sandwich DLC pads 160 on the supporting post 76, 240 on the forward ABS region 174, and 240 on the contact ABS pad 178 are preferably made in accordance with a new sandwich DLC process 300 of the present invention. In a preferred embodiment, the sandwich DLC process 300 is comprised of three layers: a seed layer 302, an intermediate cathodic-arc DLC wear inhibiting layer 304, and an outer E-DLC sacrificial layer 306.

The seed layer 302 is generally formed of silicon (Si) and is directly bonded to the underlying substrate of the slider 47, which is typically made of alumina titanium carbide ($Al_2O_3$—TiC). The silicon seed layer 302 is typically about 10 angstroms in thickness. Due to a chemical compatibility, the presence of silicon in the seed layer 302 is necessary in order to promote the formation of the DLC material of the wear inhibiting layer 304.

According to the present invention, the enabling technology of the sandwich DLC process 300 lies in the wear inhibiting layer 304 interposed between the seed layer 302 and the outer sacrificial E-DLC layer 306. The DLC process is designed to produce a carbon graphite material that mimics the properties of diamond such as high mechanical strength and chemical inertness. The thickness of the wear inhibiting layer 304 is typically about 10 angstroms.

In general, the wear inhibiting layer 304 is made of a DLC material derived from a cathodic-arc process whereby an electric arc is generated to create a plasma, which discharges fine particles of carbon ions onto the seed layer 302 to form the wear inhibiting layer 304. Owing to the cathodic-arc process, the DLC of the wear inhibiting layer possesses mechanical properties that are superior to DLC formed by other methods such as ethylene process. These superior mechanical properties afford the wear inhibiting layer 304 much greater mechanical strength and surface hardness, which are of paramount importance in controlling the surface wear of the slider 47 in the presence of the flying height sigma distribution during burnishing.

With reference to FIG. 6, the outer sacrificial layer 306 is formed on top of the wear inhibiting layer 304. The outer sacrificial layer 306 is made of a DLC material having a thickness of about 20 angstroms. The DLC material is derived from ethylene as a precursor or other similar processes. The presence of the intermediate wear inhibiting layer 304 eliminates the need for a seed layer for the outer sacrificial layer 306, since the material compatibility between the cathodic-arc DLC and the ethylene DLC is equivalent to that between silicon and ethylene DLC.

The ethylene DLC material of the outer sacrificial layer 306 generally is more compliant than the cathodic-arc DLC material of the wear inhibiting layer, as characterized by lower mechanical strength and surface hardness. Thus, during burnishing, the outer sacrificial layer 306 is allowed to wear, and also removes the asperities on the disk surface as a means to accommodate the flying height sigma distribution.

Figure 7:
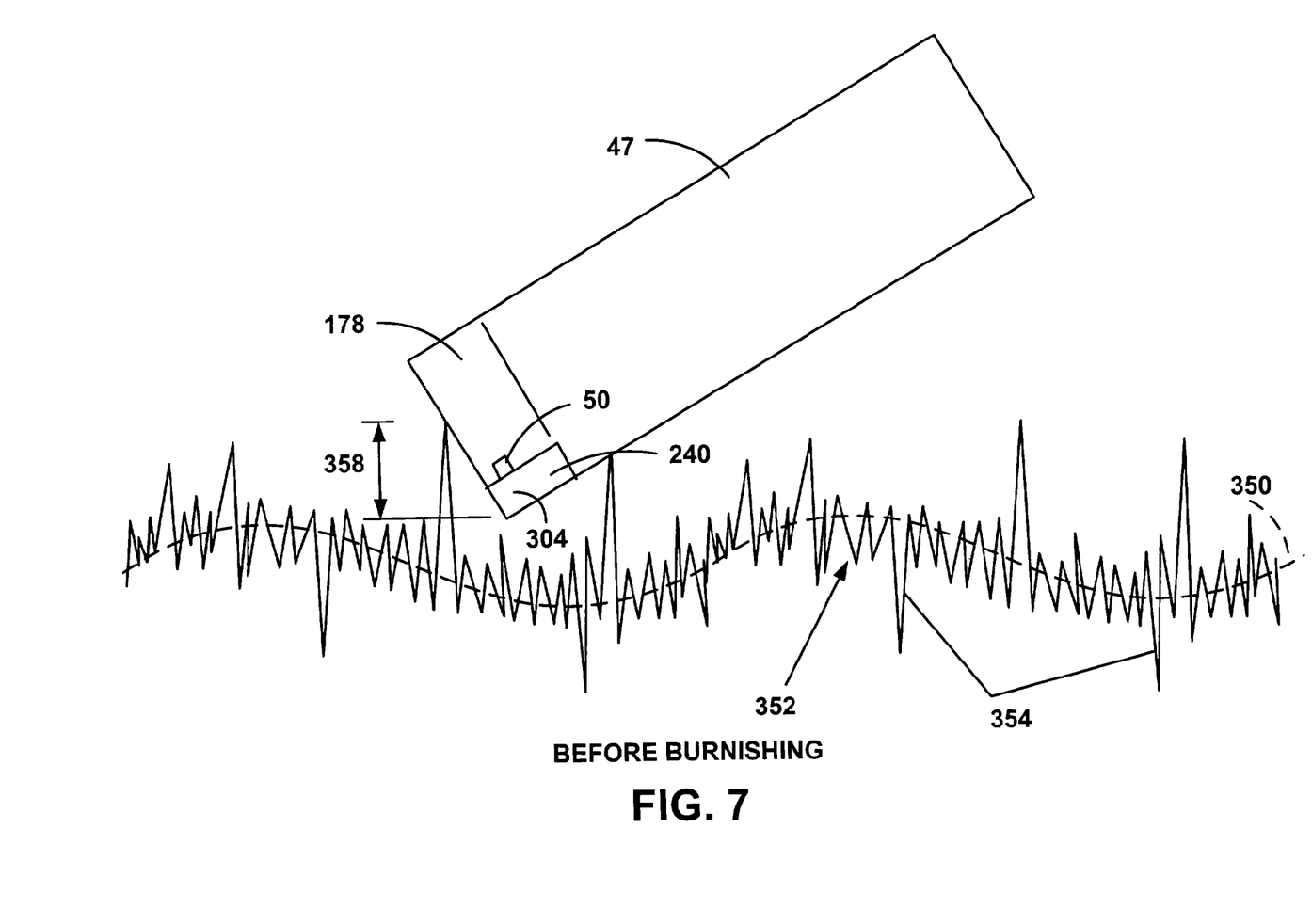
FIG. 7 is an illustration of the relationship of the ABS slider of FIG. 2 and the smooth media disk of FIG. 1 before burnishing.

The functionality and advantages of the triple-layer sandwich DLC process 300 of the present invention will be further apparent as follows:

Referring now to FIG. 7, the surface of the smooth media disk 14 is characterized by three features: disk waviness 350, disk roughness 352, and local asperities 354. The disk waviness 350 is an imaginary line that defines the average or mean surface of the disk 14. Superimposed thereon is the disk roughness 352, which is defined by the distribution of the local surface heights about the disk waviness 350. A typical disk waviness is about 2 nm RMS (root mean squared) and a typical disk roughness is also about 2 nm RMS. The sum of the disk waviness 350 and disk roughness 352 is also called as disk avalanche. By definition, the local asperities 354 are isolated high points projected above the surface of the smooth media disk 14 that could be as high as 5 to 10 times the RMS roughness.

With reference to FIG. 7, during proximity recording, the surface of the smooth media disk 14 is spinning at a rapid rate of rotation. This rapid rotation generates a sufficient differential pressure between the top and bottom of the slider 47, which is also the ABS 58, to create a lift force 250 which causes the slider to tend to be airborne. A suspension gram load 252 equal to the lift force 250 is exerted downward onto the slider 47 to maintain the slider 47 in static equilibrium. Furthermore, the suspension gram load 252 and the lift force 250 are generally offset such that the suspension gram load 252 is closer to the ABS trailing edge 62 of the ABS 58 than the lift force 250. This force offset results in a torque or moment acting in the counter clockwise direction to cause the slider 47 and hence the ABS 58 to pitch in the direction that raises the ABS leading edge 60 of the ABS 58 from the surface of the smooth media disk 14.

Initially, the pitch rotation of the slider 47 causes the ABS trailing edge 62 of the ABS 58 to come into contact with the smooth media disk 14. Due to a variation in the pitch stiffness as well as variations in the disk avalanche 356 and the local asperities 354, the initial interference height 358 is subject to a certain statistical deviation or sigma. Thus, a portion of the sandwich DLC pad 240 of the present invention located on the contact ABS pad 178 is initially engaged with the surface of the smooth media disk 14 by a varying interference height 358.

Due to the contact, both the surface of the smooth media disk 14 and the sacrificial layer 304 of the sandwich DLC pad 240 undergo a continuous burnishing, hence further reducing the surface roughness of the smooth media disk 14 and the surface of the ABS 58.

Figure 8:
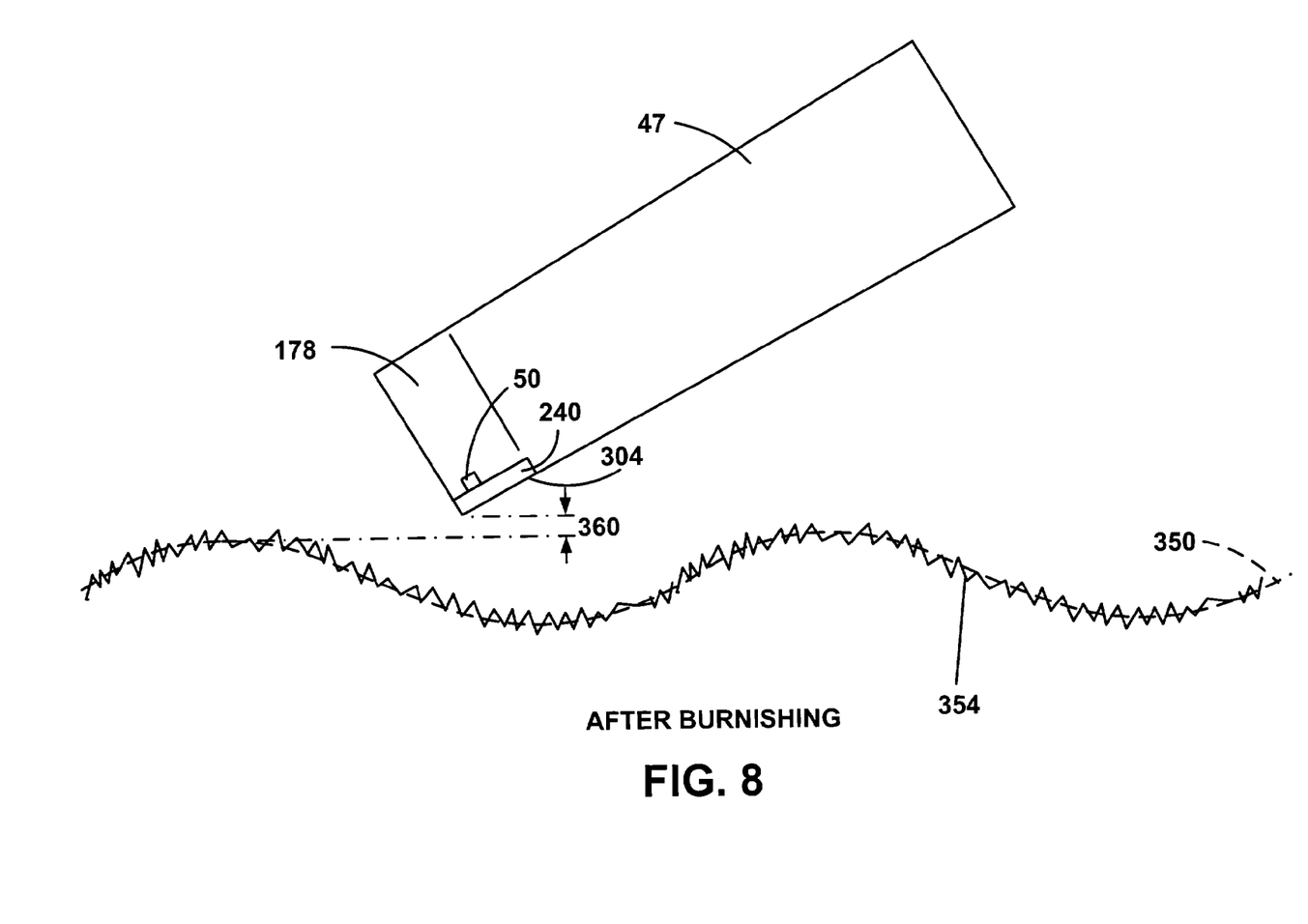
FIG. 8 is an illustration of the relationship of the ABS slider of FIG. 2 and the smooth media disk of FIG. 1 after burnishing.

With reference to FIG. 8, as the burnishing proceeds, the sacrificial layer 304 continues to diminish in thickness. Eventually, when the sacrificial layer 304 is completely worn through, the surface of the smooth media disk 14 then comes into contact with the wear inhibiting layer 302 of the sandwich DLC pad 240. Owing to the high hardness of the cathodic-arc DLC material, the wear inhibiting layer 302 continues to burnish the surface of the smooth media disk 14, while significantly resisting its own wear. Eventually, the local asperities 354 on the surface of the smooth media disk 14 are substantially reduced in size and a very small clearance 360 is consequently created, thus allowing the slider 47 to attain a uniform, near zero flying height without further burnishing the surfaces of the slider 47 and the smooth media disk 14. The goal of achieving a uniform magnetic spacing in proximity recording is therefore realized with the introduction of the wear inhibiting layer 302 in the present invention.

Moreover, once the burnishing ceases, the wear inhibiting layer 302 is still retained on the surface of the sandwich DLC pad 240 in the pole tip region, thereby providing adequate corrosion protection of the read/write element 50 and increasing the reliability of the magnetic disk drive 10.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment.

What is claimed is:

1. A recording head comprising:
    a read/write transducer;
    a slider having an air bearing surface, the air bearing surface including a center pad;
    the center pad including an aft strip that includes the read/write transducer;
    a protective layer on the aft strip;
    the protective layer comprising a seed layer, a wear-limiting layer, and a sacrificial layer;
    the sacrificial layer comprising diamond like carbon (DLC) and having a surface hardness that is less than that of the wear-limiting layer.

2. The recording head of claim 1 wherein the sacrificial layer comprises ethylene DLC.

3. The recording head of claim 2 wherein the wear-limiting layer comprises cathodic-arc DLC.

4. The recording head of claim 1 wherein the wear-limiting layer has a thickness of approximately 10 angstroms.

5. The recording head of claim 1 wherein the sacrificial layer is substantially burnished.

6. The recording head of claim 5 wherein the sacrificial layer has a thickness after burnishing that does not exceed 20 angstroms.

7. The recording head of claim 1 wherein the center pad further comprises a forward region and an aft shallow step region, the aft shallow step region being located between the forward region and the aft strip.

8. The recording head of claim 7 wherein the center pad further comprises a forward shallow step region adjacent to the forward region.

9. A disk drive having an initial phase of operation, the disk drive comprising:
    a disk;
    a recording head comprising;
    a read/write transducer;
    a slider having an air bearing surface, the air bearing surface including a center pad;
    the center pad including an aft strip that includes the read/write transducer;
    a protective layer on the aft strip;
    the protective layer comprising a seed layer, a wear-limiting layer, and a sacrificial layer;
    the sacrificial layer comprising diamond like carbon (DLC) and having a surface hardness that is less than that of the wear-limiting layer.

10. The disk drive of claim 9 wherein the sacrificial layer comprises ethylene DLC.

11. The disk drive of claim 10 wherein the wear-limiting layer comprises cathodic-arc DLC.

12. The disk drive of claim 9 wherein the wear-limiting layer has a thickness of approximately 10 angstroms.

13. The disk drive of claim 9 wherein the sacrificial layer is substantially burnished during the initial phase of operation to provide an extremely small magnetic spacing between the read/write transducer and a surface of the disk.

14. The disk drive of claim 13 wherein the sacrificial layer [306] has a thickness after burnishing that does not exceed 20 angstroms.

15. The disk drive of claim 9 wherein the center pad further comprises a forward region and an aft shallow step region, the aft shallow step region being located between the forward region and the aft strip.

16. The disk drive of claim 15 wherein the center pad further comprises a forward shallow step region adjacent to the forward region.

* * * * *